MEANS FOR RECORDING THE READINGS OF AN INSTRUMENT, OR GROUP OF INSTRUMENTS, SUITABLE FOR THE TESTING OF THE CIRCUITS OF ELECTRIC COMMUNICATION CABLES
Filed March 26, 1953 7 Sheets-Sheet 1

Stanley George Meadows
Robert Norman Sarley
Inventors

By
Richard Lovell Cleaver, Attorney

Stanley George Meadows
Robert Norman Saxby
Inventors

By
Richard Lovell Cleaver, Attorney

April 15, 1958 S. G. MEADOWS ET AL 2,830,865

MEANS FOR RECORDING THE READINGS OF AN INSTRUMENT, OR GROUP OF INSTRUMENTS, SUITABLE FOR THE TESTING OF THE CIRCUITS OF ELECTRIC COMMUNICATION CABLES

Filed March 26, 1953 7 Sheets-Sheet 3

Stanley George Meadows
Robert Norman Saxby
Inventors

By

Richard Lovell Cleaver, Attorney

April 15, 1958 S. G. MEADOWS ET AL 2,830,865

MEANS FOR RECORDING THE READINGS OF AN INSTRUMENT, OR GROUP OF INSTRUMENTS, SUITABLE FOR THE TESTING OF THE CIRCUITS OF ELECTRIC COMMUNICATION CABLES

Filed March 26, 1953 7 Sheets-Sheet 4

Inventors:
Stanley George Meadows
Robert Norman Sapley
By
Richard Lovell Cleaver, Attorney MEANS FOR RECORDING THE READINGS OF AN INSTRUMENT, OR GROUP OF INSTRUMENTS, SUITABLE FOR THE TESTING OF THE CIRCUITS OF ELECTRIC COMMUNICATION CABLES Filed March 26, 1953 7 Sheets-Sheet 5

Inventors:
Stanley George Meadows
Robert Norman Sapley
By
Richard Lovell Cleaver, Attorney Stanley George Meadows
Robert Norman Sayby
Inventors By
Richard Lovell Cleaver, Attorney April 15, 1958 S. G. MEADOWS ET AL 2,830,865

MEANS FOR RECORDING THE READINGS OF AN INSTRUMENT, OR GROUP OF INSTRUMENTS, SUITABLE FOR THE TESTING OF THE CIRCUITS OF ELECTRIC COMMUNICATION CABLES

Filed March 26, 1953 7 Sheets-Sheet 7

Inventors:
Stanley George Meadows
Robert Norman Sapley
By
Richard Lovell Cleaver, Attorney

United States Patent Office 2,830,865

Patented Apr. 15, 1958

2,830,865

MEANS FOR RECORDING THE READINGS OF AN INSTRUMENT, OR GROUP OF INSTRUMENTS, SUITABLE FOR THE TESTING OF THE CIRCUITS OF ELECTRIC COMMUNICATION CABLES

Stanley George Meadows, Hornchurch, and Robert Norman Saxby, Liverpool, England, assignors to Southern United Telephone Cables Limited, Dagenham Dock, England, a British company Application March 26, 1953, Serial No. 344,702

Claims priority, application Great Britain March 28, 1952

10 Claims. (Cl. 346—34)

Figure 1:
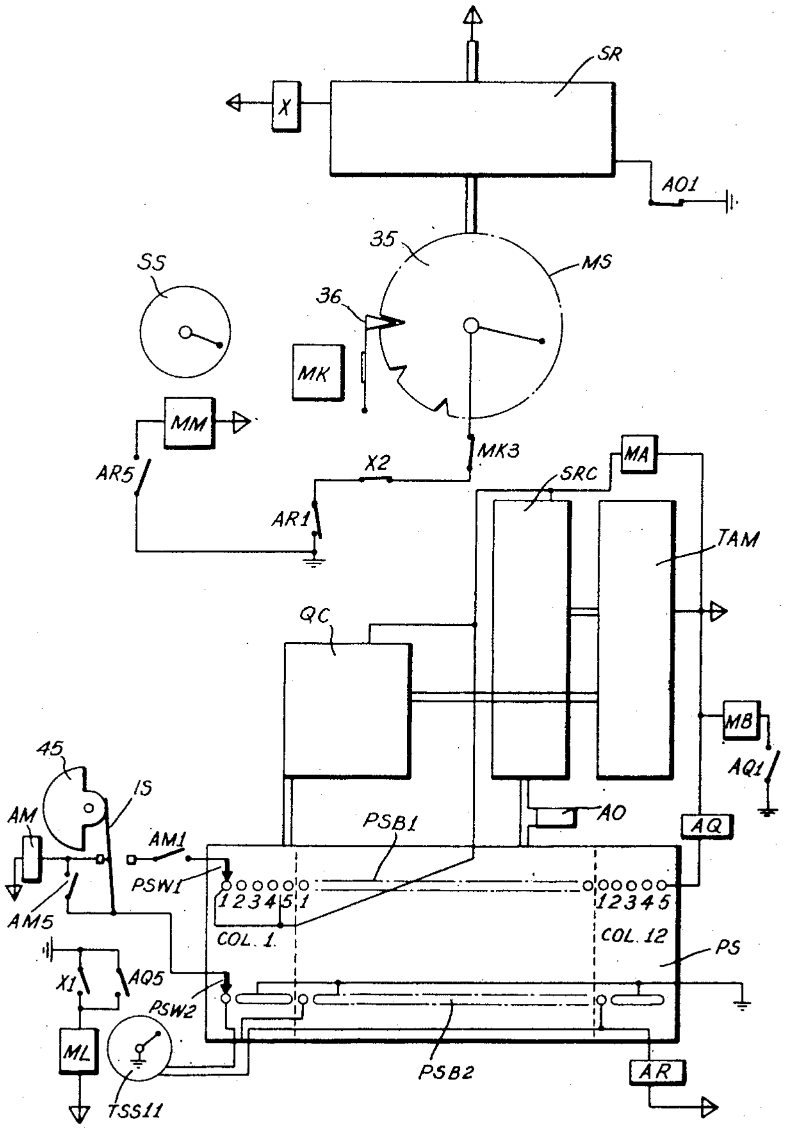

This invention is concerned with the recording of readings of an instrument, or a group of instruments. It does not deal with recordings by means of marking points or lines on a chart, but provides for the printing of the readings by means of type on a record sheet. The result attained in this recording is the production of columns of figures, with or without signs, typed in appropriate positions on the record sheet.

The device by which the record is printed may be a modified typewriter. Such an arrangement has the advantage that ordinary hand operation of the keys to add typed matter at will on the record sheet may be used. The essential of the printing device is that it contains a number of type-operating means, each adapted to print one or more numerals or signs and each under electromechanical control, in combination with a carrier for the record sheet and means for producing relative movement between the sheet and the type, that is moving the position of the typing step by step across the sheet (spacing movement).

The electro-mechanical control device may consist of an electro-magnet, the armature of which is attached to the lever of the type so as to pull this downward when the magnet is excited, thus giving an effect equivalent to the action of the finger on the key.

The apparatus also comprises a multi-point switch, or group of switches, which is set for each of the readings to be recorded. After the setting has been fixed the printing device proceeds to print the reading on the record sheet.

The term "reading" is used herein as indicating a value to which an instrument, or group of instruments, is set either by hand operation or otherwise. It is possible that the instrument may be such that a visual indication is given so that an actual reading can be taken. In many cases, however, this will not be so and it is not necessary for the operation of the invention.

Apparatus of this kind is described in application Serial No. 234,134, now Patent No. 2,726,130, issued December 6, 1955. The present invention provides a modified and improved form of such apparatus with the object of increasing the speed of operation and reducing the manual control needed.

An example of a recording to which the invention could be applied, which is described in the aforesaid application, is the testing of the groups of wires (quads) of a telephone cable for out-of-balance capacities and mutual capacities. As is well known this requires for each group of wires the taking of a number of readings in appropriate sequence representing out-of-balance and mutual capacities between different members of the group and between such members and other parts of the cable. For each group there may, for instance, be eleven readings, each consisting of a sign followed by one or more numerals. The readings are obtained by adjusting a capacitor, or groups of capacitors, to produce a balance in a bridge: the adjustment may be on either the positive or negative side of zero. In making the record the figures are set in columns (which may be eleven in number) in a line across a sheet of paper. At the beginning of each line a symbol indicating the identity of the group of wires under test is typed in; then follow the entries for the tests. In such a case, as each setting of the multi-point switch or group is made, the recording apparatus is put into motion and the appropriate reading is typed on the record sheet in the appropriate column. The present invention deals particularly with that class of recording apparatus.

In accordance with the specification of the said application, circuit connections are made by the multi-point switch, or group, for one or more columns of figures, with or without signs, and these connections are arranged to co-act with other connections set up by a position switch actuated by the spacing movement of the carrier relative to the type on the printing device. In this way a circuit is established for each pair of associated positions of the multi-point switch and the position switch for the actuation of a type member appropriate for printing a part of the reading at the correct position on the record sheet. This arrangement secures that each reading is printed in the appropriate column on the sheet.

In the method of operation set out in the said application the operative circuit for the printing comprises both the multi-point switch and the position switch so that the former must remain in the position set as the result of a reading during the time in which that reading is being recorded on the sheet. The next test cannot begin until this recording is complete. Thus, in that previously described apparatus, the steps of setting of readings and of printing them were mutually exclusive in time: the setting device and the printing device could not operate simultaneously. By the present invention this interconnection in time relation is released and it is made possible for the preparation of a reading to proceed while printing is in progress. By this means the time of making a complete set of tests is much shortened.

This result is obtained by the use of a system of storage relays, some of which are set in operative position by the multi-point switch for each reading and are retained in that position independently of the multi-point switch and establish in conjunction with the position switch the necessary printing circuits. Immediately on the attainment of a setting of the multi-point switch, as the result of a test, the appropriate storage relays are energised and locked; whereupon the multi-point switch is free to proceed to the next test. Interlocking circuits are provided to ensure that the independent but related operations of the multi-point switch and the storage relays take place correctly. These interlocks provide, for instance, that if actuation of the type by the storage relays for the printing of the test result is not completed in the time taken by the testing apparatus to set at the multi-point switch the reading for the next test, the setting is held in the multi-point switch until the printing is complete and the storage relays are free to be energised for the next reading.

Since each line of printing across the record sheet relates to a set of tests applied to a particular group of wires, it is necessary to apply some identifying mark to each line. This may be done by printing a number in the first column of each line. By the present invention, and in accord with the system of independent but related operations above indicated, it is provided that this identifying number can be printed in its position while the first test is proceeding. This may be done by the use of a counter mechanism to number the lines in numerical order, this mechanism actuating the type through their control magnets under interlocking arrangements (similar to those above referred to) which prevent the storage relays from energising the printing magnets for printing the first test reading before the printing of the identifying number is complete. As each printing of this number takes place the counter sets itself in readiness for the printing of the next number, which will occur when the position switch on the typing device returns to the position for the first column on the sheet. This may be brought about by hand or by the actuation of a relay through the position switch when the carrier arrives at the end of a line to cause it to move into place for the beginning of the next line.

In accordance with the invention a further automatic control is obtained by inter-connecting the operation of the test sequence switch with the position switch on the typing device and making the operation of the sequence switch automatic. This test sequence switch may be, for instance, a rotary switch with a number of levels of contacts which in each angular position of the switch make the appropriate connections for a particular test. This switch may have an additional level of contacts interconnected with the contacts of the position switch of the printing device so that the circuits necessary for ensuring the correct location of the carrier for each test are established jointly by the test sequence switch and the position switch. There may also be provision for the omission of certain tests, for instance where these are unnecessary when dealing with a certain class of cable. This can be done by the manual operation of keys which rearrange connections of the position switch and the test sequence switch so that they pass through certain normally operative positions without providing for the carrying out of the tests appropriate thereto.

The invention will be further described in relation to an apparatus in accordance with the invention for automatically recording tests on the quads of a telephone cable. The apparatus is described by way of example and is illustrated in the accompanying circuit diagrams wherein:

Figure 1 is a block diagram representing the main components of the apparatus and their operative relation;

Figures 2–6 together form a detailed diagram; and

Figure 4:
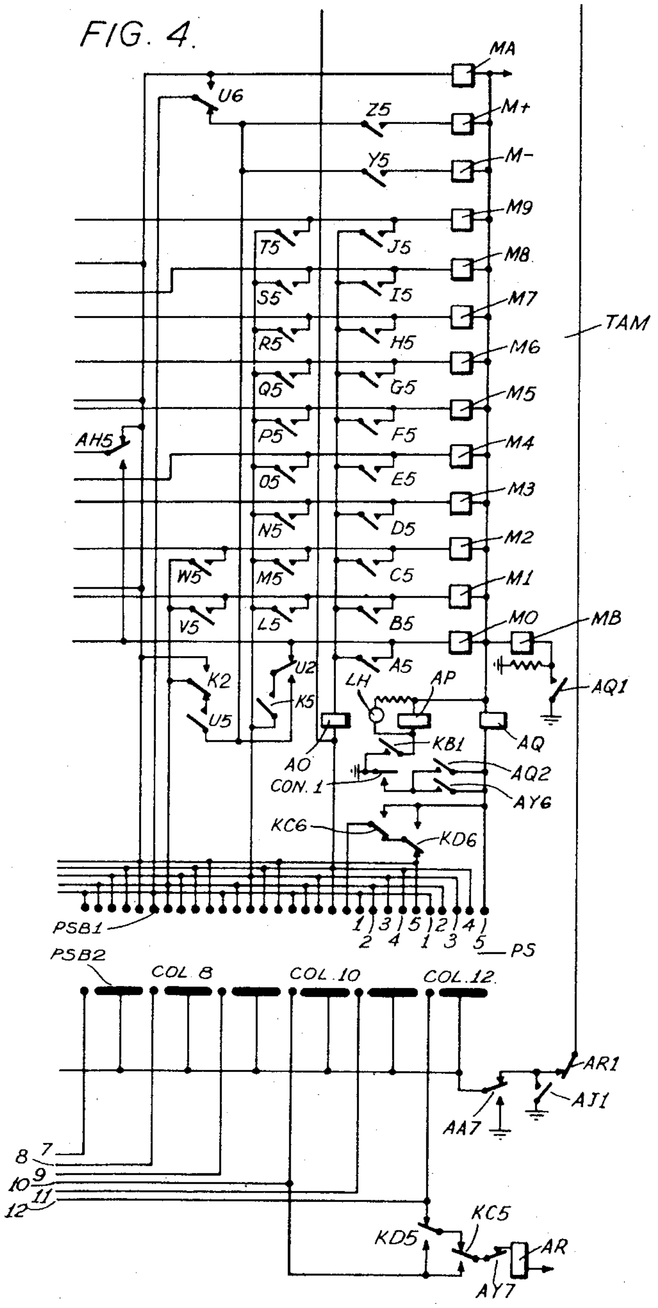
Figure 5:
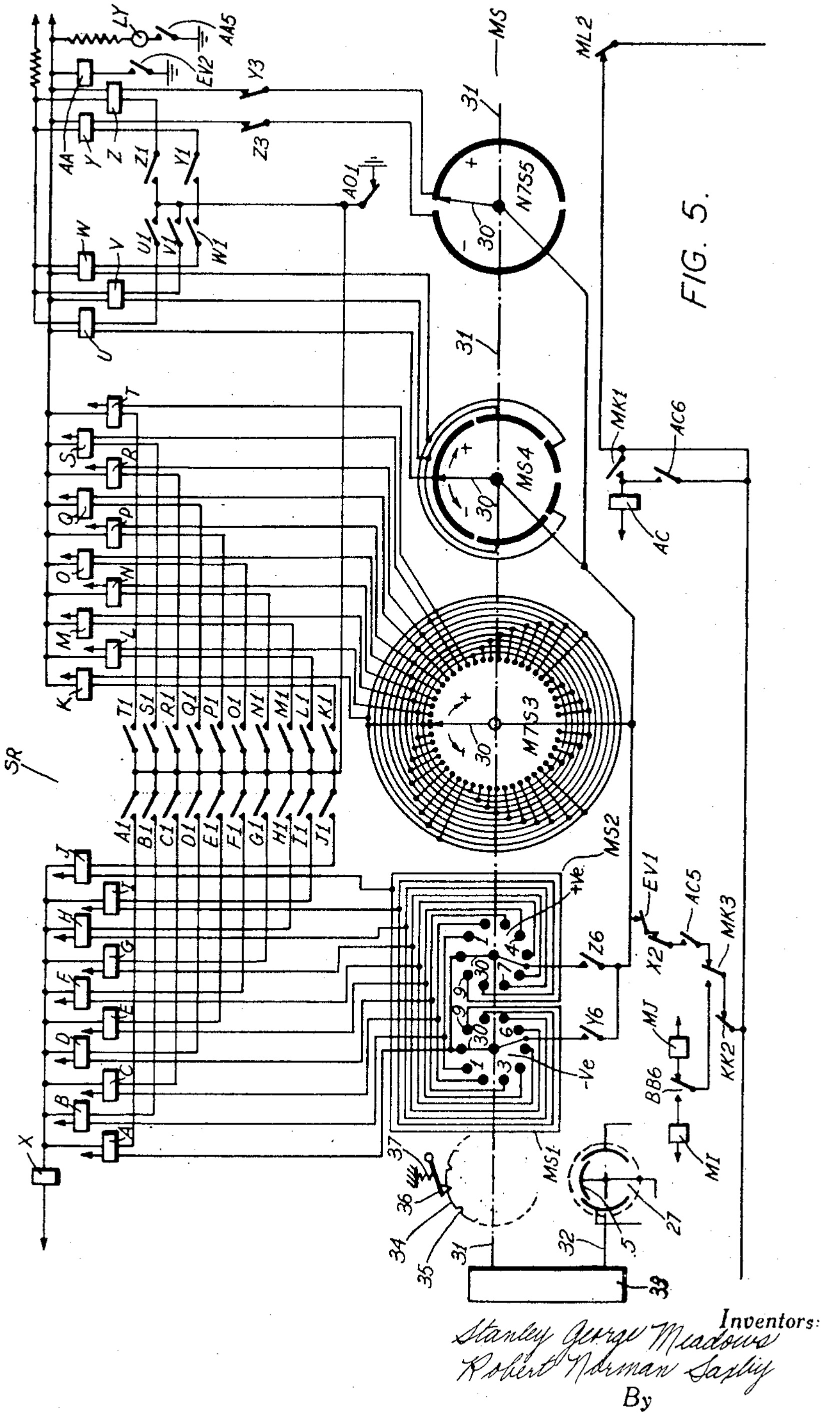
Figure 6:
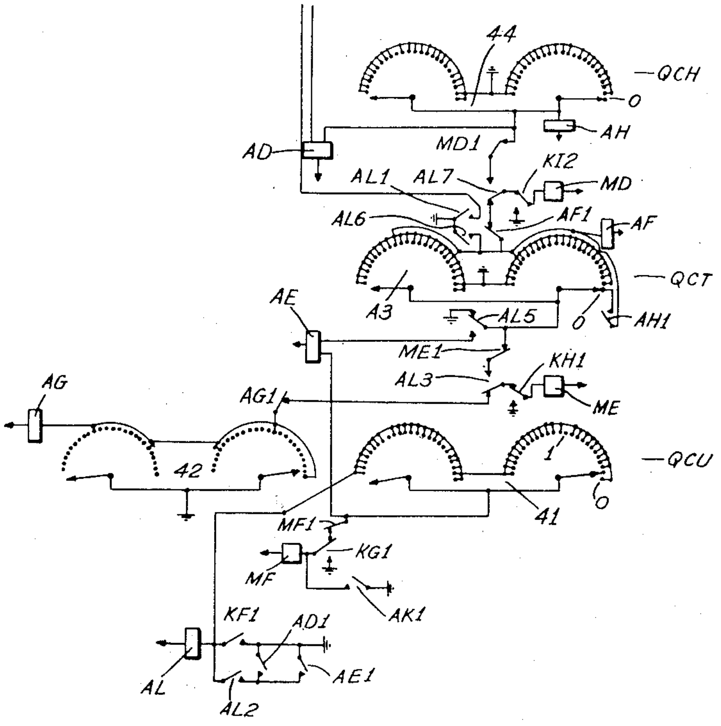
Figure 7:
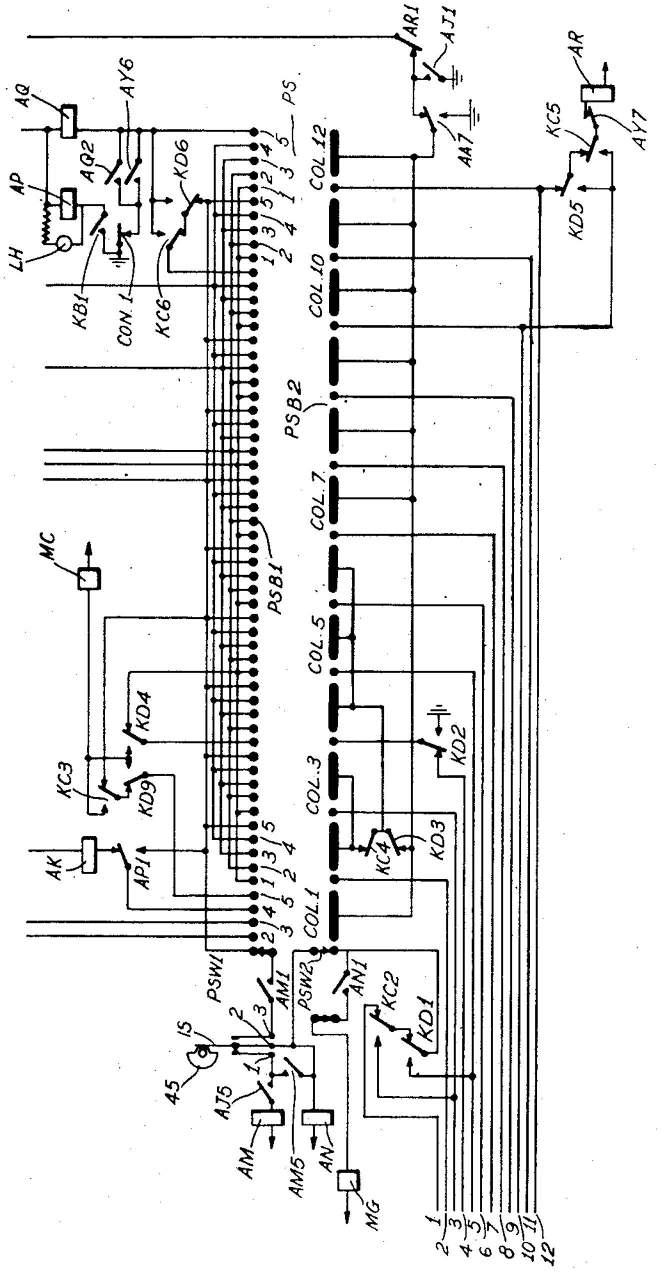

Figure 7 combines portions of Figures 4 and 5 which it is desirable to refer to as a unit.

The apparatus includes a number of relays which are given letter references and the switches operated thereby are represented by the same letters with numerical suffixes. There are also a number of electro-magnets for carrying out mechanical operations and these have two-letter references with M as the first letter.

All the movable parts of the apparatus are shown in the normal condition, that is the condition of the apparatus when set for carrying out the first test in a series and before the operator depresses the necessary switches to initiate the testing operation. All the relays and magnets are excited by switching one side to earth, the other side being permanently connected to a source of direct current. A triangle at the free end of a line is intended to indicate the direct current source, and the earthed terminal of a circuit is shown by the conventional earth sign. In Figure 1 where double lines are shown connected to pieces of apparatus the convention is adopted that they represent a large number of wires appropriate for the co-operation of the two pieces of apparatus. The block features in Figure 1 which are represented in detail in the remaining figures are a storage relay group SR, a group of type-actuating magnets TAM, the storage relay contacts SRC, the quad counter QC, the multi-point switch MS, the position switch PS, the test sequence switch TSS and the socket selector switch SS.

The object of the apparatus is to measure the capacity conditions existing between the four wires of a telephone cable quad, and between those wires and the wires of an adjacent quad. The wires of the quads to be tested are connected by hand in correct sequence to a number of sockets and the quad to be tested is brought into condition for connection with the test apparatus by a socket selector switch SS. Four quads SZ, SA, SB and SC are shown plugged into a connecting box 1 from which appropriate connections are taken to the socket selector switch SS. The switch SS provides a series of eight connections leading to a rotary test sequence switch TSS comprising a number of levels of which only one, TSS11, is indicated in Figure 1. The test sequence switch TSS has twelve positions and provides the connections for a set of eleven tests. Each of the eleven tests is made by an automatically balancing bridge 2. The switch levels which provide the necessary connections between the leads from the socket selector SS and the bridge 2 and an oscillator 3 are contained within the switch block TSS1. Another switch block TSS2 contains the necessary levels to provide interconnection between these leads and an automatic insulation testing unit 4. The bridge 2 and its associated apparatus and also the insulation test unit form no part of this invention being covered by our United Kingdom Patent Nos. 714,201 and 739,712 respectively.

The socket selector switch SS and the test sequence switch TSS are automatically operated by arrangements described hereinafter. The tests are recorded by a modified typewriter, the carriage of which moves two wipers PSW1 and PSW2 which travel over two banks of contacts PSB1 and PSB2 in the position switch PS mounted on the typewriter. The arrangement is in general similar to that described and illustrated in the specification of our application Serial No. 234,134. As in that application, the types for printing the numerals 0 to 9 and the signs + and — can be actuated by the type actuating magnets TAM in addition to a manual operation by the keys. The record of the test of each quad consists of twelve columns. In the first column is printed the identifying number of the quad and in each of the other columns is printed a test reading consisting of a sign followed by a number consisting of one, two or three digits. The contacts in both banks PSB1 and PSB2 of the position switch are thus divided into twelve sets. In bank PSB1 each set contains five contacts numbered 1 to 5. In bank PSB2 each set comprises a short contact in the same position as contact 1 in bank PSB1 and a long contact covering all the positions 2 to 5 of that bank.

Some of the contacts in group COL1 of bank PSB1 are associated with the quad counter QC which comprises a number of uni-selector switches provided with means for homing to the starting condition required for numbering the first of a set of quads e. g. those forming a layer in a cable.

Associated with the adjustable differential capacitor 27 in the bridge 2 is a multi-point switch MS. The adjustable element 5 of the capacitor 27 is driven by a reversible motor drive such as is described in our United Kingdom patent application No. 8,961/52 and is connected to the multi-point switch MS through a reduction gear. Banks of contacts in the multi-position switch provide for three columns of figures and for the two signs + and —. The switch QC may come to rest in any position representing a reading and is locked in each of those positions by a catch 36 engaging in one of ten notches 35 in a disc 34 carried by the switch. The locking is brought about automatically at the completion of the test, that is to say when a balance of the bridge 2 has been obtained. The multi-point switch MS sets the circuits of the storage relay group SR which includes the storage relays A to Z. These storage relays are self-locking by means of switches A1 to W1, Y5 and Z5. The type actuating magnet group TAM comprises the series M0 to M9, M—, and M+, and also a space magnet MA which controls the space bar of the typewriter, a tabulator magnet MC and a carriage return magnet MB.

Appropriate switches are provided under the control of the storage relays and the quad QC to select the appropriate magnets for printing the quad identity number and the bridge reading. These elements will now be described in more detail together with the interconnecting circuits.

The socket selector switch SS comprises five levels 6 to 10. The levels 6 to 9 each comprise four fixed contacts and three wipers. The fixed contacts are connected with the quads through the interconnecting box 1. The wipers in the five levels are operated by a common driving shaft 11 though a step-by-step rotary drive 12. The drive 12 comprises a rotary driving member 13 and a pin 14 adapted to be turned through one revolution when a magnet MM is energized and to engage and turn a notched disc 15 through 90°. The notched disc 15 is fixed to the shaft 11. From the socket selector SS there extends eight leads in two groups 16 and 17. The effect of the socket selector switch is to connect the cores of one quad to group 16, another quad to group 17 and another quad to earth, the fourth quad being unconnected. The fourth quad represents a quad which has been tested and replaced by a new quad. The test sequence switch TSS is driven by a rotary member 18 carrying a pin 19 and adapted to be turned through one complete revolution when a magnet ML is energized. The pin 19 engages one of twelve notches in a driven disc 20 fixed to the common shaft 21 to which all the wipers of the test sequence switch TSS are attached. The test sequence switch TSS is thus moved through one twelfth of a rotation for each operation of the magnet ML.

The test sequence switch levels within the switch block TSS1 provide the appropriate connections between the lead groups 16 and 17 and the bridge 2. The elements of the bridge comprise two fixed condensers 22 and 23, two inductances 24 and 35, a pick-up coil 26, and the variable differential condenser 27 comprising two fixed plates and a rotatable plate 5. Five leads are taken from this bridge network into the switch block TSS1 and the switching is appropriate to connect the bridge capacitively or inductively according to the test required. An oscillator 3 is also connected by the switch block TSS1 to the appropriate points in the circuit. By means of the levels within the second switch block TSS2 the leads are tested for continuity of insulation by the insulation tester 4 connected to an appropriate source of potential 27 through a switch AZ5. Switch AZ5 is closed by relay AZ and the cores are automatically tested in sequence. If all the cores pass this test satisfactorily a relay BF is energised and this initiates the necessary operations for balancing the bridge.

Figure 2:
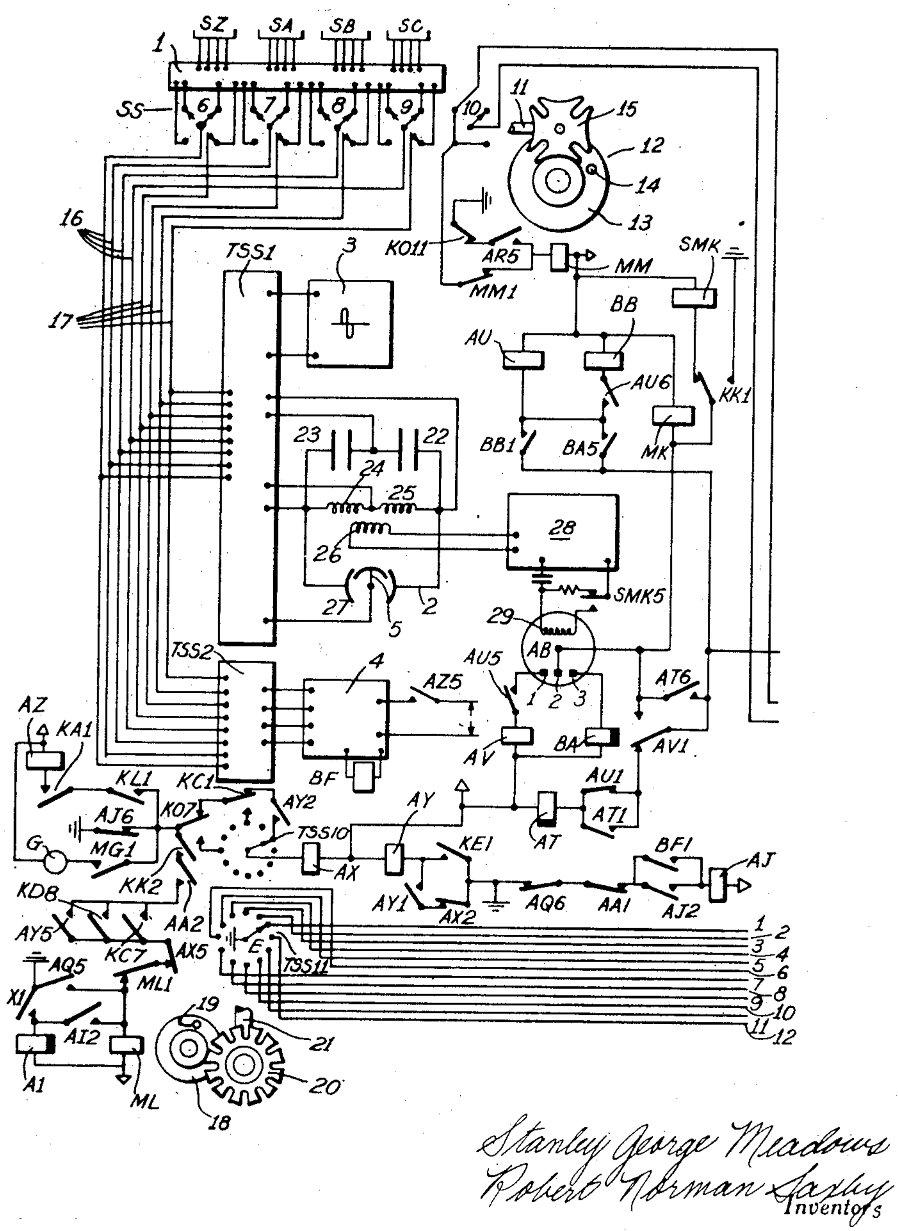
Figure 3:
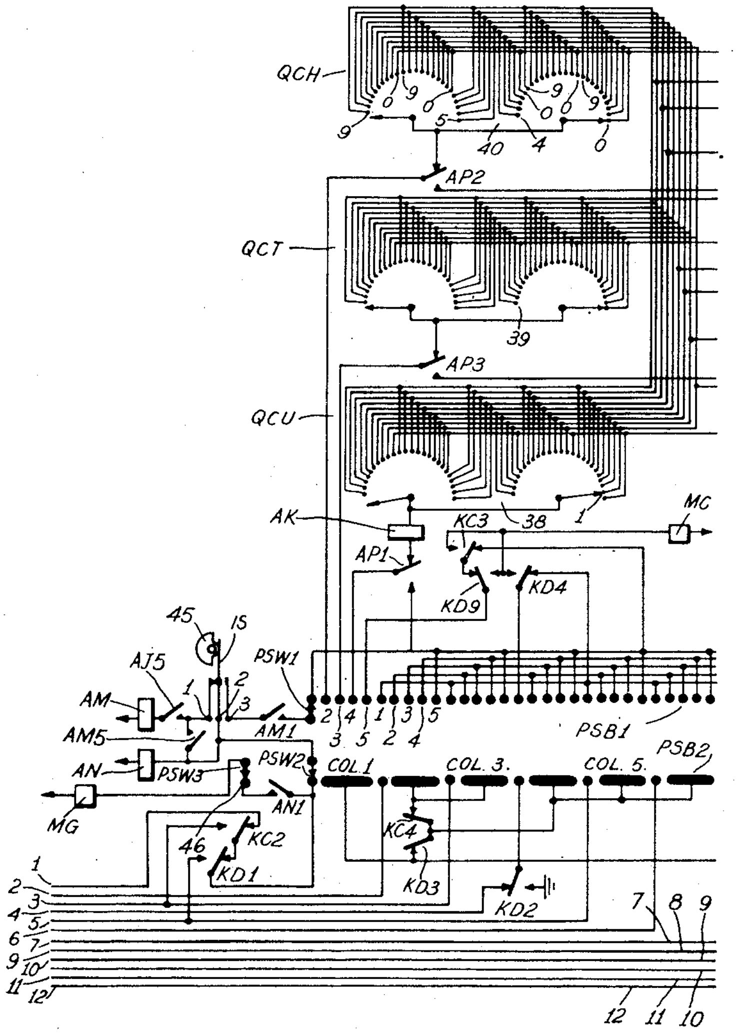

Once set in operation the bridge balances automatically. The pick-up coil 26 feeds into an appropriate amplifier and balance indicator 28. The output from this indicator 28 is taken to the coil 29 of a polarised relay AB which is adapted to cut-off the drive to the movable element 5 of the differential condenser 27 when a balanced condition is reached. At the end of this operation the appropriate storage relays in the group SR have been operated and locked. The setting of the multi-point switch MS when the bridge is balanced determines which of the storage relays have been operated. The multi-point switch MS comprises five switch banks MS1 to MS5. Each of these banks comprises a rotary wiper arm 30 movable over a circular array of fixed contacts. The wiper arms 30 are driven through a common shaft 31 connected with the shaft 32 by which the differential condenser 27 is driven through a reduction gear 33 so that shaft 31 makes one full revolution during a unit variation of capacity of the condenser 27. For instance this unit variation may be 100 pf. the full range being + or −2,500 pf. The multi-switch banks MS1 and MS2 are duplicate banks, one dealing with negative readings and the other with positive readings. Both switch banks MS1 and MS2 comprise ten fixed contacts numbered 0 to 9 arranged clockwise in bank MS2 and anti-clockwise in a bank MS1. Contacts of the same significant figure are joined together and each pair thus joined is permanently connected to one of a group of ten storage relays A–J. The fixed contacts in switch banks MS1 and MS2 correspond to the "ten's" figure in the reading. The next multi-switch bank MS3 comprises a centre 0 contact and two substantially semi-circular groups of twenty-four contacts extending one of each side of the 0 contact. In moving clockwise the wiper 30 moves over the positive group and in moving anti-clockwise over the negative group. These are the hundred's contacts. Contacts representing the same significant figure are joined together and each set is connected to one of the appropriate group of storage relays K–T respectively. Multi-switch bank MS4 comprises a centre zero contact extending over the range of −9 to +9 of the contacts in bank MS3. At the ends of this centre contact are two other contacts extending respecively over the range −10 to −19 and +10 to +19 of contacts in the bank MS3. These contacts are again followed by two more contacts corresponding to −20 to −24 and +20 to +24 of the contacts in the bank MS3. This is the "thousands" bank. The centre contact in bank MS4 is connected to storage relay U, the next contacts corresponding to the significant figure 1 are connected together and to storage relay V, and the remaining contacts corresponding to the significant figure 2 are connected together and to the storage relay W. The final multi-switch bank MS5 deals with the sign of the reading and comprises two substantially semi-circular contacts extending one on each side of the central position of the wiper arm 30, the positive on the right hand and the negative on the left hand. The negative contact is connected to storage relay Y and the positive contact to storage relay Z. It will be seen that when the apparatus is in operation one or the other of the storage relays Y and Z will be operated according to the sign of the reading and this will close the appropriate one of switches Y6 and Z6 to select either the positive or negative of the ten's banks MS1 and MS2. The arrangement is such that the wiper arms of MS3 and MS4 move from one contact to the next while the wiper arms in banks MS1 and MS2 are moving from contact 9 to contact 0 in either direction. This requires the centre 0 contact in bank MS3 to be twice as wide as the remaining contacts in that bank. In bank MS5 the wiper arm is set to move from the positive contact to the negative contact with the switch arms in MS1 and MS2 move from 0 to −1.

To the shaft 31 is fixed the previously mentioned disc 34 having on its periphery ten equally spaced notches 35. A catch 36 pivoted at one end and provided with a projection at the other end is normally maintained with this projection in engagement with one of the notches by a spring 37. This locks the differential condenser 27 and all the banks of the multi-point switch MS against rotation. The lock is released while the bridge is being balanced by energising an unlocking magnet MK. The differential condenser 27 can be operated manually if necessary and is fitted with dials for visual reading. When the bridge is balanced the circuit of the magnet MK is opened and the multi-point switch MS locked in position with the appropriate storage relay circuits established for printing the reading of the differential condenser. The storage relay circuits from the multi-point switch MS are closed to earth by way of the switch MK3 when unlocking relay MK is not energised and switches X2 and AR1 which are normally closed. The storage relays close their own holding switches A1 to Z1, Y5 and Z5 respectively and these establish a new circuit through a relay X and switch AO1. The relay X is a slow acting relay to ensure the complete actuation of the storage relays before switch X2 is opened. When this occurs the position of the storage relays becomes independent of the movement of the multi-point switch MS and this can then be put into use in a performance of the next test. The exciting of the relay X closes a switch X1 which completes a circuit for the magnet ML which in turn actuates the test sequence switch TSS causing it to move into the next position. When the storage relays are locked they selectively close one or more of a group of switches A5—Z5 which select appropriate type operating magnets for printing the result of the test.

Bank PSB1 of the position switch contains twelve sets of contacts indicated as COL1—COL12. There are five contacts in each set, that is one contact for each possible printing position across the record sheet. Accordingly the wiper PSW1 is on one of these contacts for each of the possible positions of the typewriter carrier. The set of contacts COL1 is used for printing the quad identification number and each of the other sets for printing a test result. The contacts in each set are numbered 1, 2, 3, 4, and 5. Only a few of the contacts are shown in Figure 1 but they are all indicated in the remaining diagrams.

In bank PSB2 of the position switch the contacts in each set consist of a short contact in the first position and a long contact covering positions 2, 3, 4, and 5. All the long contacts are connected together and are earthed during the operation of the apparatus through switch AJ1 or AA7. Each of the short contacts in bank PSB2 is connected either directly or by switching to one of the twelve contacts which constitute level TSS11 of the test sequence switch. The wiper arm of level TSS11 is permanently earthed.

For co-operation with the contacts of bank PSB1 a motor driven cam 36 actuates an impulse switch IS continuously at a rate appropriate for printing one type per impulse, for instance, six impulses per second. This switch IS consists of a contact arm 2 carrying a contact which is oscillated between a left and a right hand fixed contact 1 and 3 respectively. When it is in the left hand position it completes a circuit through the relay AM, switch AJ5 being closed, and bank PSB2 of the position switch, assuming that the wiper PSW2 is on an earthed contact. When the relay AM is excited it closes its holding switch AM5 and also the switch AM1. Through this last switch AM1 a circuit is made from the right hand contact 3 of impulse switch IS to the wiper PSW1 on the other bank of the position switch. When the impulse switch IS is in the right hand position, bringing contacts 2 and 3 together, it directs a current impulse through any complete circuit connected to a contact of bank PSB2 of the position switch on which the wiper PSW2 rests.

Contact 1 in the first set COL1 of bank PSB1 and contact 5 of all the sets except the last on this bank are permanently connected to the space magnet MA which at each actuation moves the carrier one space without the actuation of the type. Contacts 2, 3, and 4 of the first set COL1 are connected through the quad counter QC to the type actuating magnets and space magnet MA. The contacts 1, 2, 3 and 4 of all sets except the first in this bank are connected through storage relay contacts to the type actuating magnets and the space magnet MA. It will be seen that when wiper PSW2 is on an earthed contact and wiper PSW1 is on a contact other than contact 5 in the last set, an impulse may be directed first through the quad counter or through the storage relay contacts to a type magnet or to the space magnet MA. Movement of the carrier can thus occur with or without the precedent of type actuation.

The group of uni-selector switches comprising the quad counter QC is provided with means for homing to the position in which a circuit is set through the type actuating magnet M1 when the wiper PSW1 is in contact 4 of the first set COL1. This provides for the starting condition of the numbering of a set of quads e. g. those forming a layer in a cable. In this condition for each of the position switch positions 2 and 3 the quad counter QC establishes a connection through the spacing magnet MA. The actuation of the type magnet M1 at contact 4 in set COL1 is followed by the automatic movement of the quad counter QC to prepare a circuit for the type magnet M2 when the carrier of the position switch is next in position 4 of set COL1. This counting and printing procedure can continue up to the number 999.

A slow acting relay AO is inserted between the storage relay contacts and each of the contacts number 4 with the exception of the first in level PSB1 of the position switch. These contacts number 4 provide for the typing of the last digit in any test result and accordingly when an impulse passes to the appropriate type actuating magnet through the storage relay contacts in this position the relay AO is actuated and opens switch AO1. This breaks the circuits to a relay X and the storage relays so that they and their contacts are released and put in a condition to receive a further setting from the multi-point switch MS. The slow action of relay AO ensures the release of all the storage relays; that is to say it retains switch AO1 open long enough for the various relay holding contacts to break. The release of relay X causes switch X2 to close to prepare the way for a further actuation of the storage relays when switch MK3 returns to the position shown on the completion of a setting of the multi-point switch MS. Connected with the first small contact of the twelfth set in bank PSB2 of the position switch PS is a relay AR and this is actuated when the moving arm of bank TS11 of the test sequence switch engages the twelfth contact. Relay AR is the test completion relay and when thus energised it closes switch AR5 to establish the circuit of the magnet MM which moves the socket selector switch SS forward by one step to bring the next quad into co-operation with the test sequence switch. While this is occurring the switch AR1 breaks the circuit to the multi-point switch MS as a safe-guard against the operation of the storage relays by this switch MS.

In addition to the contacts already described in bank PSB2 of the position switch there is an extra contact 37 to the extreme left of the first set COL1 in a position six spaces from contact 1 of this set. This contact 37 is operative only when engaged by a third wiper PSW3 in the initial testing position.

The operations which take place as the carrier of the typewriter moves through a complete line on the record sheet are as follows:

The socket selector SS has just moved into position to bring the appropriate quad into the testing condition and the wiper of level TSS11 of the test sequence switch is on the first contact. The quad counter QC is in the home position and the power has been applied to the apparatus from the appropriate source. Wiper PSW2 is on contact one of set COL1 in bank PSB2. A circuit is completed from earth via the wiper arm of level TSS11, contact 1 of this level, switches KC2 and KD1, contact 1 in set COL1 of bank PSB2, wiper PSW2 and relay AN which operates. Contact 2 of impulse switch IS is also earthed. This closes switch AN1 between contact 1 in set COL1 and the above-mentioned contact 37 and provides a circuit through the return wiper PSW3 to a key magnet MG. The key magnet releases a lock to enable the operator to close switch KA1 with one hand. It will be appreciated that this switch cannot be closed therefore unless the typewriter carriage has returned to the proper starting position. A second switch KL1 is connected in series with switch KA1 for depression by the operator who must thus use both hands to set the apparatus in operation. These two switches complete, with switch AJ6, a circuit to relay AZ. This closes switch AZ5 applying the test voltage to the insulation tester 4. When the cores have been successfully tested relay BF is excited and this completes a circuit to relay AJ which closes its own holding switch AJ2.

Relay AJ produces the following conditions. It opens switch AJ6 to disconnect the insulation testing relay AZ. It closes switch AJ1 to provide an earth on the long contacts in bank PSB2 and to complete the circuit for the capacity testing over switch AR1. It also closes AJ5 to impulse switch IS contact 1 and excites relay AM which starts the quad identification number printing. It also opens the homing circuit to the test sequence switch driving magnet ML at AJ6.

Relay AM is locked in position by closure of switch AM5. Switch AM1 is also closed so that an impulse can be fed from the impulse switch IS to the wiper PSW1 of position switch bank PSB1. On the first contact of set COL1 this establishes the circuit to the space magnet MA and the carrier moves forward one step. This brings the wiper PSW2 of bank PSB2 to the adjacent long contact which maintains the earth connection to this wiper through switch AJ1. The wiper PSW1 is also brought on to the second contact in set COL1 in bank PSB1 and the typewriter proceeds to type the appropriate number determined by the position of the quad counter. This automatically causes the position switch to travel through positions 2, 3, and 4 to position 5 in set COL1 where the space magnet MA is again actuated so that wiper PSW1 is now on contact 1 of the second set COL2. At the same time wiper PSW2 of bank PSB2 passes to the short contact in the second set COL2.

The setting and typing of the quad identity number is effected as follows: The quad counter QC involves three levels of uni-selector switches QCU, QCT, and QCH. Each of these levels involves two groups one of which determines the number to be printed by the position of its wipers and the other of which operates the driving magnets for that group. The first mentioned group comprises the levels 38, 39 and 40. The levels of the other group are indicated by 41 and 42 associated with level 38 in level QCU, 43 associated with level 39 in level QCT, and 44 associated with level 40 in level QCH. Level QCU determines the units figure, QCT the ten's figure and QCH the hundred's figure. The driving magnet for level QCU is the magnet MF, for QCT magnet ME and for QCH magnet MD. The uni-selectors of the quad counter are conveniently formed of standard telephone types containing 25 contacts in the arc and up to six levels. In level QCU all six levels are in use and in the remaining units only four levels are in use. In order to enable them to be used as ten-point banks the opposite ends of alternate wipers, which are normally double ended, are removed and the contacts are multipled by wiring five times over two levels. Thus for example the two wipers of level 38 in level QCU operate as one wiper sweeping over fifty contacts, one wiper being in engagement while the other is in disengagement. These uni-selectors are all of the type which step on to the next contact when the driving magnet releases.

Relay AM operates the first time that the contact 1 and 2 of the impulse switch come together. The relay locking switch AM5 closes and contact 3 of the impulse switch IS is connected to wiper PSW1 and AM1. This ensures that when contacts 2 and 3 engage in the impulse switch IS a full impulse is sent to the space magnet MA. When the impulse contact switch 2 and 3 open space magnet MA releases but the earth is maintained on wiper PSW2 so that AM remains operated. When contacts 2 and 3 of the impulse switch again engage a pulse is passed over the second contact in COL1 of PSB1 to the wiper of quad counter level 40 which is on the 0 contact and this is directly connected to the space magnet MA so that the position switch PS moves forward to the next contact. The same thing takes place the next time an impulse is sent out from the impulse switch, the space magnet MA being connected to the third contact through the wiper of bank 39 of the quad counter engaging the 0 contact. In the fourth position the type actuating magnet M1 is operated through the connection between one wiper of level 38 in engagement with contact 1. When this circuit is made a relay AK is also energised and this closes switch AK1 to energise a magnet MF. As the typewriter prints figure one in the fourth position it moves forward one step so that the circuit through AK is interrupted, switch AK1 is opened, magnet MF is de-energised and the levels in the unit counter QCU step forward one position to set the counter for printing number 2 at the beginning of the next series of tests. The next impulse from the impulse switch IS is transmitted through contact 5 and switches KD9 and KC3 in the position as shown to the space magnet MA over the connection between this magnet and the fifth contacts in all the sets COL2 and COL11.

Quad identification numbers above one are printed in the following manner. After printing the ninth quad identity number the uni-selector QCU steps on to the 0 contact and two circuits are made in parallel through the wiper in level 42 to a relay AG and the driving magnet ME for the uni-selector QCT. Relay AG is a slugged relay which operates to open the circuit to magnet ME at switch AG1. When magnet ME is de-energised it causes uni-selector QCT to move on to contact 1. The circuit is now prepared for printing quad identity number 10. Thus on the third contact of bank PSB1 a circuit is made through the first contact in level 39 of QCT to type magnet M1. On the fourth contact a circuit is made to type magnet M0 by the engagement of the wiper in level 38 of QCU with the 0 contact. A similar procedure provides for the printing of a significant figure in the second position of the position switch PS. In this case a slugged relay AF opens switch AF1 to interrupt the circuit to magnet MD which is the drive for the uni-selector group QCH. Furthermore when the wiper in level 44 of group QCH moves from 0 to the first contact, the relay AH operates to change over switch AH5 and connect contact 0 of level 39 in uni-selector group QCT with the type magnet M0, so that a nought will follow the significant figure in the hundreds position of the quad identity number when required. This condition arises only at this level.

While the quad identity number is being printed in COL1 the first capacity test is being carried out. A circuit to earth has been made through switches AJ1, AR1, ML2 and AU1 to operate relay AT. This closes switch AT6 to operate the condenser unlocking magnet MK. While the condenser is being unlocked, relay AC is operated by closure of switch MK1. Switch AC6 is closed to lock relay AC after switch MK3 has changed position. Switch MK3 has now closed the circuit to magnet MJ over switch BB6 to drive the differential condenser 27 and the associated multi-position switch in the anti-clockwise direction. At the closing of switch AT6 there is also operated a relay SMK which changes over a switch SMK5 to connect the coil 29 of the polarised relay AB to the balance indicator 28.

Dependent upon the out-of-balance condition of the bridge 2 one of two states is set up in the polarised relay AB. Should the condenser 27 be moved towards balance the contacts AB2 and 1 will close, but without effect. After condenser 27 has passed through the balance position the effect of the output from the balance indicator 28 will be to cause contacts AB2 and 3 to close to operate relay BA. This gives rise to the following operations. Switch BA5 closes to operate relay AU, switch AU6 closes to operate relay BB, and switch BB1 closes to lock both relays AU and BB. Switch BB6 changes to release the anti-clockwise magnet MJ and operate the clockwise magnet MI so that the condenser 27 is now moving back again towards the balanced position. Switch AU1 has been opened but without releasing relay AT which is locked by switch AT1. Switch AU5 has also been closed in the circuit to relay AV. As the condenser 27 returns towards the balance point the sensitive relay contacts AB1 and 2 come together, and relay AV is operated. This changes the position of switch AV1 to close a circuit in parallel with switch AT6 and break the circuit to the slugged relay AT. When the relay AT releases a switch AT6 opens. When the condenser 27 reaches the balance position, contact 2 of the polarised relay AB moves into a central position thus breaking its connection with contact 1. This releases relay AV so that switch AV1 returns to its original position and, since AT6 opened when relay AT released, the circuit to the unlocking magnet MK is broken. The multi-point switch MS is therefore locked at the required reading. At the same time switch MK3 returns to the normal position to break the circuit to the magnets MI and MJ which control the rotation of the differential condenser 27.

The switch MK3 together with switches AC5, X2 and EV1 form the circuits to the wipers of all the banks of the multi-point switch MS. One of two circuits is completed to banks MS1 and MS2 according to whether the reading is positive or negative. Switch Y6 is in one of these circuits and switch Z6 in the other and both are controlled by storage relays Y and Z. The selection of the appropriate bank MS1 or MS2 is determined by the position of the wiper in the sign bank MS5. If this is on the right hand contact the positive relay Z will be operated, to open the circuit to the negative relay Y at switch Z3 and close the circuit to bank MS2 at Z6. In addition to these sign relays three other storage relays are operated on the closing of switch MK3, one connected to one of the banks MS1 and MS2 and one connected to each of the banks MS3 and MS4. These relays close the appropriate locking contacts and energise the holding relay X in a manner already indicated. At the same time the relays A to W close the appropriate circuits from the position switch bank PSB1 to the type-operating magnets M0 to M9, and relay Y or Z closes either switch Y5 or Z5 to magnet M− or M+. The relay X has in effect locked the readings of the multi-point switch MS in the storage relays A to W and this switch can now be released to make the next test.

When relay X operates, the circuits through the storage relays via the multi-point switch MS are all opened by the opening of switch X2. The test sequence switch TSS is stepped forward by the process of first energising the magnet ML by closing switch X1 and the subsequent opening of switch AI2 following the operation of slugged relay AI which is brought into circuit when X3 closes. The test sequence switch TSS is thus moved on to the next contact and earths the first contact in the second set COL2 of position switch bank PSB2. This energises the impulse controlling relay AM in the manner already explained and prints in the second column the reading of the test already made, the printing operation being effected similarly to that already described for printing the quad identity number. From the first contact a printing circuit is made to either magnet M+ or M− selected by the closing of switch Z5 or Y5. From the second contact the circuit is to either magnet M2 or M1 according to the setting of either V5 or W5. From the third contact the circuit is to one of the magnets M0–M9 according to the setting of one of the switches K5–T5, and from the fourth contact to one of the magnets M0–M9 according to the setting of one of the switches A5–J5. Finally on the fifth contact the space magnet MA is operated. It is clear that the storage relays locked through relay X can be released when the tens digit is printed. This is effected by the series release relay AO in the printing circuit from the fourth contact. When this relay AO operates it opens the switch AO1 to interrupt the circuits to the relay X and storage relays. Relay AO is slow to release, thereby ensuring complete release of the storage relays.

During the stepping on of the test sequence switch TSS by magnet ML the switch ML2 is opened and closed, thus temporarily removing the earth connection from the relay circuits associated with the polarised relay AB in the balance detection circuit, so that the holds on those relays are released in preparation for the next test.

As in the case of the apparatus described in application Serial No. 234,134 provision is made in co-operation between the storage relay switches and the position switch bank PSB1 for providing in the record evidence that the recording apparatus has worked efficiently throughout the range of the three positions of the record figure when a significant figure appears in the last one or two positions only. This is done as in the previous case by moving the position of the sign from the first to a later position. The circuits controlled by the contacts of the multi-position switch MS are made to produce the desired result by means of additional relays.

In the event of a two-significant figure reading, the sign is printed in the second instead of the first position. Relay U is operated from the centre contact of the thousands bank MS4 of the position switch MS and relay K is unoperated since the wiper 30 of the hundreds bank MS3 is not on the centre contact. The pulse from contact 1 is thus routed by switch U6 to the space magnet MA. The pulse from contact 2 is routed by switch K2 in its normal position and switch U5 to a sign magnet M− or M+ over the appropriate switch Y5 or Z5. The operations on the remaining contacts 3, 4, and 5 are as already described. Where there are no significant figures in the second and third of the reading, the wiper 30 of the hundreds bank MS3 will also be on the centre contact, so that storage relay K is operated and switch K2 is closed. The pulse from contact 2 will thus be diverted to the space magnet MA by switches K2 and U6. The pulse from contact 3 is diverted to one of the sign magnets over the switches K5 and U5. The operations on contacts 4 and 5 are unaffected.

Should the quad identity number be printed before the first capacity test is completed, the wiper PSW2 arrives at the first contact in COL2 of position switch bank PSB2 before it has been earthed by the stepping on of the wiper in bank TSS11 of the test sequence switch. The typewriter thus waits for the test to be completed. The same situation arises between the printing of successive test results. If any test is completed before the preceding printing step is complete, the next printing will proceed as soon as the wiper PSW2 engages the first contact in the appropriate column since this contact will have been earthed by the moving on of the test sequence switch TSS. In the event of any one test being completed before the preceding test result has been fully recorded, the multi-point switch MS will remain in the locked condition until the release of relay X recloses switch X2 to complete the earth connection to the storage relay operating circuits. In the final position of the test sequence switch the wiper of level TSS11 is on the twelfth contact to provide the earth for printing the eleventh reading in COL12 of the record.

When the final test is fully recorded, wiper PSW1 moves onto the fifth contact in COL12 and an impulse passes to the return relay AQ which locks to earth over switch AQ2 and carriage off-normal switch CON1. The switch CON1 is a spring switch which is open only when the position switch PS is in the normal position for the beginning of a series of tests. Switch AQ1 closes to operate the carriage return magnet MB which returns the typewriter carriage to the normal position. Relay AJ is released by the opening of switch AQ6, thus opening switch AJ1. This releases the balance indicator circuit relays AU and BB and also relay AC which opens switches AC5 and AC6. At the same time switch AQ5 closes the circuit to magnet ML which subsequently operates to step the test sequence switch TSS into the position for the first test of the next series. When the test sequence switch level TSS11 wiper moves to the twelfth contact, the completion relay AR is operated. This opens switch AR1 to remove the earth from the testing circuits and closes switch AR5 to operate magnet MM and move the socket selector switch SS through half a step. When the test sequence switch moves on to the next position the circuit to the test completion relay AR is opened, releasing switch AR5 and magnet MM so that the socket selector switch SS completes its movement. It will be seen that retesting cannot commence until the position switch has reached the normal position.

At the end of a series of tests on a cable it is required to home the quad counter QC to the initial position to start a new series of counting. When the socket switch SS and/or quad counter level QC4 are off-normal, a homing relay AD operates, and when quad counter levels QCT and/or QCU are off-normal a homing relay AE operates. These relays close switches AD1 and AE1 which prepare parallel circuits for operating a homing relay AL. To effect homing a switch KF1 is closed manually, operating relay AL and locking it at switch AL2. This completes the earth connection of all contacts of the driving levels 41, 43 and 44 of the quad counter uni-selectors except the home contacts 0 in levels 44 and 43 and the home contact 1 in level 41. It also connects the wipers of level 10 of the socket selector SS and levels 41, 43 and 44 of the quad counter uni-selectors and their magnets MM, MF, ME and MD in series with their own interrupter switches MM1, MF1, ME1 and MD1 respectively and these wipers step by self-interruption. When each wiper reaches its home contact it stops and when the last switch has homed, relays AD and AE are both released. This releases the homing relay AL and restores the quad counter circuits for numbering the next series.

If for any reason the multi-position switch MS moves beyond its maximum range it is arranged to close spring contacts constituting an excess value switch. The excess value switch EV2 closes to operate an excess value relay AA and this closes switch AA5 to light a signal lamp LY. Earthing relay AJ is released by opening of switch AA1, and switch AJ1 opens to stop the operation. To prevent stepping of the test sequence switch TSS when AJ6 returns to normal, switch AA2 opens in the circuit to the stepping magnet ML. The storage relays do not operate because the banks MS3, MS4 and MS5 of the multi-position switch are on open contacts, banks MS1 and MS2 are inoperative because neither of switches Y6 or Z6 is closed, and relay X remains normal. The position switch stops on the first contact of whichever set it reaches after printing the value of the last effective test. The operator now introduces extra capacitors into the bridge and moves two switches KK1 and KK2. The first switch KK1 energises the unlocking magnet MK, and the other KK2 breaks the homing circuit to magnet ML of the test sequence switch which will not home when relay AA is released. The required test is now carried out manually and relay AA is released. The result can be typed manually. The test sequence switch TSS must be stepped forward one position manually, the added capacities must be removed and switches KK1 and KK2 restored to normal. The switches KA1 and KL1 are now closed and the apparatus automatically proceeds to test and print in the normal manner.

In some circumstances some of the tests provided for in a line may be omitted. Let it be considered that tests 1 and 2, 10 and 11 are to be omitted. A multiple of switches KC is operated and locked. Of these, switch KC1 earths the third contact in level TSS10 of the test sequence switch and KC7 earths the test sequence switch magnet ML through its own interrupter switch ML1. The sequence switch TSS steps until the wiper in level TSS10 goes to earth on its third contact and operates relay AX. This opens switch AX5 and interrupts the circuit to magnet ML and the sequence switch TSS stops in the third position. Switch KC2 changes to connect the first contact in set COL1 of the position switch bank PSB2 to earth through the third contact of sequence switch level TSS11. Switch KC4 opens to disconnect the long contacts in bank PSB2 from the connection to the earthing switch AJ1. Switch KC6 connects the fifth contact in set COL10 bank PSB1 to the relay AQ. A tabulator magnet MC is connected through switch KC3 to the fifth contact in set COL1 in bank PSB1, and the test complete relay AR is connected by switch KC5 to the first contact in set COL10 of bank PSB2. The squad identity number is printed as before in the first position, but during this time the third measurement is being made instead of the first. When wiper PSW1 engages the fifth contact in bank PSB1 the tabulator magnet MC operates to move the position switch through the next two positions, so that the third result is printed while the fourth test is in progress. The test complete relay AR operates when wiper PSW2 is on the first contact of set COL10 in bank PSB2, and relay AQ operates from the fifth contact in set COL10 in bank PSB1, thus terminating the set of tests and returning the mechanism to begin a new set of tests at the third position of the test sequence switch TSS.

Another arrangement of tests is effected by throwing a switch multiple KD. Switch KD1 joins the sixth contact of sequence switch level TSS11 to contact 1 in set COL1 of bank PSB2; switch KD2 earths the first contact inset COL4 of that bank; switch KD3 isolates from earth at AJ1 the long contacts in sets COL2–6 of that bank; and KD5 connects to the test complete relay AR the first contact in set COL10 of the same bank. In bank PBS1, the first contact in set COL4 is connected to the tabulator magnet MC by switch KD4, and the fifth contact in set COL10 is connected to relay AQ by switch KD6. The sixth contact in level TSS10 of the sequence switch is earthed by switch KD7, and switch KD8 earths the homing circuit of the test sequence switch which now moves into the sixth position. The fifth contact in set COL1 in bank PSB1 is also joined to the tabulator magnet MC by switch KD9. This now provides for testing and recording from the sixth to the tenth tests by a procedure similar to that just described. The only difference is that there are two movements of the tabulating mechanism, one when wiper PSW1 engages the fifth contact in set COL1 and the other when it engages the first contact in set COL4.

The tests corresponding to a line can be repeated if necessary. When the apparatus is in the normal condition the socket selector switch SS can be turned back one step by hand and the units group QCU of the squad counter stepped forward by means of switch KG1 until it shows one less figure than before. The apparatus is then set in operation in the usual manner. To meet various circumstances the tens and hundreds groups QCT and QCH can be stepped by means of switches KH1 and K12 respectively.

The apparatus can be set to normal at any time by operation of a switch KE1 which energises relay AY and this locks through switches AY1 and AX2. Switch AY2 now connects to earth the first contact in sequence switch level TSS10; switch AY5 sets the circuit for sequence switch magnet ML; switch AY7 disconnects the test completion relay AR, and switch AY6 operates relay AQ resulting in the return of the carriage and position switch to the normal position. The carriage off-normal contacts CON1 thus open, to release the relay AQ and open switch AQ6 to release relay AJ. This opens AJ1 to stop testing and printing. The homing circuit for the sequence switch TSS is completed at switch AJ6 and this homes to the first contact position. Relay AX operates to open switch AX2 and release relay AY, which in turn releases relay AX by opening switch AY2. The circuits are now normal.

Quad identity number printing can be cut out by closing a self-locking key KB1 which operates a relay AP. This transfers the connections, at switches AP1, AP2 and AP3, to the space magnet MA from the second, third and fourth contacts in bank PSB1 of the position switch.

What we claim as our invention is:

1. A record printer for electrically typing a series of readings of an instrument in columns across a record sheet on a step-by-step movable carrier, comprising type-operating circuits, a position switch actuated by the carrier, a multi-point switch adapted to be set for each reading, storage relays for establishing type-operating circuits appropriate for a reading, storage relay operating circuits selectively controllable by the multi-point switch, means for isolating the storage relay operating circuits from the multi-point switch after the type operating circuits appropriate to a reading are established, means actuated by the position switch to complete in sequence the selected typing circuits, means for holding the storage relays energised until a reading is printed means actuated by the position switch for releasing the storage relays after the reading is printed, means for holding the multi-point switch in a re-set condition and means for restoring the connection between the multi-point switch and the storage relay operating circuits after the storage relays are released.

2. A record printer for electrically typing in sequence a series of readings of an instrument in columns across a record sheet on a step-by-step movable carrier, comprising type operating circuits, a position switch actuated by the carrier, an adjustable element for setting the instrument to the required reading, a multi-point switch adapted to be set for each reading of the instrument, coupling means interconnecting the adjustable element and the multi-point switch, storage relays selectively operable by the multi-point switch for establishing in conjunction with the position switch the appropriate circuits through the type operating circuits, means for isolating the multi-point switch from the storage relays when said type-operating circuits have been selected, self-setting means for the adjustable element, a lock for holding the multi-point switch in any required setting, means effective during the adjustment of the adjustable element to hold said lock out of engagement and to re-apply the lock when the adjustable element is at the required setting.

3. A record printer for electrically typing the sequential readings of an instrument in columns across a record sheet on a step-by-step movable carrier, comprising typing circuits, storage relays for selecting the typing circuits appropriate for a reading, a multipoint switch to be set for each reading, storage relay operating circuits selectively controlled by the multipoint switch, means for isolating said storage relay operating circuits from the multipoint switch when the storage relays appropriate to a reading have been operated and a position switch actuated by the carrier to complete in sequence the typing circuits selected by the storage relays.

4. A record printer for electrically typing the sequential readings of an instrument in columns across a record sheet on a step-by-step movable carrier, comprising typing circuits, storage relays for selecting the typing circuits appropriate for a reading, a multipoint switch to be set for each reading, storage relay operating circuits selectively controllable by the multipoint switch, means for isolating the storage relay operating circuits from the multipoint switch when the storage relays appropriate to a reading have been operated, a position switch actuated by the carrier to complete in sequence the typing circuits selected by the storage relays, and means actuated by the position switch after the printing of a reading to release the operated storage relays and to restore the connections between the multipoint switch and the storage relay operating circuits.

5. A record printer for electrically typing in sequence a series of readings of an instrument in columns across a record sheet on a step-by-step movable carrier, comprising type-operating circuits, a position switch actuated by the carrier, a multi-point switch adapted to be set for each reading, storage relays selectively operable by the multi-point switch for establishing in conjunction with the position switch type-operating circuits appropriate for the reading, means for isolating the multi-point switch from the storage relays when said type-operating circuits have been selected, an electro-magnetically operating multi-position stepping switch counter for selecting type-operating circuits appropriate for the reading of the counter, and said position switch including circuit closing positions for completing, during the setting of the multi-position switch for the first reading, the type-operating circuits selected by said counter.

6. A record printer for electrically typing in sequence a series of readings of an instrument in columns across a record sheet on a step-by-step movable carrier, comprising type-operating circuits, a position switch actuated by the carrier, a multi-point switch adapted to be set for each reading, storage relays selectively operable by the multi-point switch for establishing in conjunction with the position switch type-operating circuits appropriate for the reading, means for isolating the multi-point switch from the storage relays when said type-operating circuits have been selected, an electro-magnetically operating multi-position stepping switch counter for selecting type-operating circuits appropriate for the reading of the counter, said position switch including circuit closing positions for completing, during the setting of the multi-position switch for the first reading, the type-operating circuits selected by said counter, an electro-magnetic relay for stepping said stepping switch counter, and the circuit for said relay being controlled by said position switch to move the counter through one digital step after the completion of the said circuits selected by said counter.

7. A record printer for typing the characteristics of a series of circuits as tested in succession by an instrument, the record being a series of readings of the instrument in the form of a line of figures in appropriate columns across a record sheet on a step-by-step moving carrier, comprising type operating circuits, a position switch actuated by the carrier, a multi-point switch adapted to be set for each reading, storage relays selectively operable by the multi-point switch to establish in conjunction with the position switch the appropriate type operating circuits for each reading, means for isolating the multi-point switch from the storage relays when said type-operating circuits have been selected, a test sequence switch to establish connections between the circuits to be tested and the instrument, said test sequence switch being an electromagnetically operated stepping switch, a stepping circuit for said stepping switch, said position switch including contacts for energising said stepping circuit at the end of each reading, and said test sequence switch including means for setting up a condition for the typing of each reading when said test sequence switch is in a condition appropriate for making the next test.

8. A record printer for typing the characteristics of a series of circuit arrangements of each of a number of circuit groups, as tested by an instrument connection in succession to the individual circuit arrangements in the series, the record of each series being a line of readings printed in appropriate columns across a record sheet on a step-by-step movable carrier, comprising type-operating circuits, a position switch adapted to be actuated by the carrier, a multi-point switch adapted to be set for each reading, storage relays selectively operable by the multi-point switch to establish in conjunction with the position switch the appropriate type operating circuits for a reading, means for isolating the multi-point switch from the storage relays when said type-operating circuits have been selected, an electro-magnetically operable stepping test sequence switch for establishing connections between the circuits to be tested and the instrument, a stepping circuit for said stepping switch, said position switch including contacts for energising said stepping circuit at the end of each reading, the test sequence switch being a rotary switch completing one full cycle of movements during the recording of each series, a step-by-step operable selector switch adapted to connect the circuit groups in sequence to the sequence switch, and means for stepping the selector switch through one step at the end of each series of readings.

9. A record printer as claimed in claim 7, in which the test sequence switch is a rotary switch with more than one level of contacts and is adapted in each predetermined angular position to make the appropriate connections for a particular test.

10. A record printer as claimed in claim 7, in which the test sequence switch is a rotary switch with more than one level of contacts, interconnection is provided between the contacts in one of the levels and the contacts of the position switch, and said interconnection is adapted to establish correct location of the carrier for each test jointly by the test sequence switch and the position switch.

References Cited in the file of this patent

UNITED STATES PATENTS

| | | |
|---|---|---|
| 2,059,627 | Robinson et al. | Aug. 4, 1936 |
| 2,068,711 | Robinson et al. | Jan. 26, 1937 |
| 2,439,497 | Tholstrup | Apr. 13, 1948 |
| 2,467,929 | Colt | Apr. 19, 1949 |

U. S. DEPARTMENT OF COMMERCE

PATENT OFFICE

CERTIFICATE OF CORRECTION

Patent No. 2,830,865 April 15, 1958

Stanley George Meadows et al.

It is hereby certified that error appears in the printed specification of the above numbered patent requiring correction and that the said Letters Patent should read as corrected below.

Column 5, line 3, after "quad" insert -- counter --; line 35, for "24 and 35" read -- 24 and 25 --; column 6, line 46, for "with" read -- when --; column 14, lines 2 and 42, for "squad", each occurrence, read -- quad --.

Signed and sealed this 20th day of May 1958.

(SEAL)
Attest:

KARL H. AXLINE

Attesting Officer

ROBERT C. WATSON
Commissioner of Patents